Patented Feb. 17, 1942

2,273,569

UNITED STATES PATENT OFFICE 2,273,569

PROCESS FOR THE RECOVERY OF SILVER

August Goette, Frankfort-on-the-Main, Germany, assignor, by mesne assignments, to Chemical Marketing Company Inc., New York, N. Y.

No Drawing. Application January 19, 1939, Serial No. 251,833. In Germany June 26, 1937

4 Claims. (Cl. 75—105)

My invention relates to an improved process for the recovery of silver.

It is an object of my invention to recover silver from waste material such as photographic papers, films, plates and the like containing silver or silver compounds without destruction of the remaining components of such waste material. This is accomplished according to my invention by leaching out the waste material with solutions containing alkali cyanide and preferably adjusted to pH values of more than 7, for example between 8 and 9, at normal or somewhat raised temperatures, preferably with aeration of the mixture, and separating the silver by the usual methods from the solutions, after the latter have been separated from the residues. By means of this simple process, which has no disadvantages associated with it, it is possible on the one hand to ensure a complete recovery of the valuable silver whilst on the other hand the remaining components of the waste material such as paper, gelatine and the like can be recovered and may if desired again rendered utilisable for example by washing out the leached out material and if desired drying.

By means of my present process, photographic papers may be completely desilvered even by use for example of very dilute cyanide solutions, for example solutions containing about 0.01 to 0.1% of sodium cyanide. For de-silvering gelatine film, somewhat stronger solutions, for example solutions containing about 0.1 to 3%, preferably 0.1 to 1% sodium cyanide have proved very suitable.

The solutions containing cyanides are preferably adjusted to a pH value of more than 7, for example from about 8 to 9. Hereby the advantage is inter alia obtained that escape of hydrocyanic acid can be prevented with certainty. The adjustment to the desired alkaline reaction may most simply be effected by addition of milk of lime.

The treatment of the waste material with the solution containing alkali cyanide is preferably effected with stirring and aeration. The desilvering process may be accelerated not inconsiderably by employing moderately heated cyanide solutions. For example gelatine films may be caused to swell up rapidly by the action of the solutions at moderately raised temperatures and in this way the leaching out may be facilitated. The swelling of the silver-containing gelatine may also be effected before beginning the actual leaching out process, for example by soaking in water, preferably hot water.

Waste material which contains coatings which prevent the attack of the cyanide solution may be separated from such coatings before beginning the leaching out process. Thus for example gelatine films with nitrocellulose coatings may be freed from the latter by treatment with suitable solvents, for example acetone. The silver present in the solutions obtained by the leaching out and separation from the residues may be recovered therefrom by the usual methods, for example with the aid of zinc dust, wood charcoal or the like.

Waste material which contains practically only silver compounds, i. e. is free from metallic silver or only contains small quantities thereof, may advantageously be worked up by employing solutions containing non-poisonous thiosulphate instead of solutions containing alkali cyanide. The leaching out with thiosulphate solutions may be effected in the same way as the leaching out of the waste material with solutions containing cyanide described above. In this case also it is advantageous to carry out the process with aeration of the mixture.

If it is desired to leach out waste material which contains substantial quantities of metallic silver in addition to silver compounds with thiosulphate solutions, then it is advisable to convert the metallic silver into silver compounds, which are readily soluble in thiosulphate solutions, prior to the leaching out process. For example by treatment of the waste material with suitable oxidising agents, for example hydrogen peroxide, the metallic silver may be converted into silver oxide or the silver may be converted into silver chloride by treatment of the waste material with suitable chlorinating agents, for example with chlorine in the presence of water. The agents to be employed for the conversion of metallic silver into the desired silver compounds should be chosen so that disturbances are avoided and the substances carrying the silver, such as paper or gelatine, remain as far as possible intact.

The silver-containing cyanide solutions or thiosulphate solutions obtained by leaching out the waste material may advantageously be worked up by precipitating the silver present in the solution in the form of silver sulphide by means of soluble sulphides, such as sodium sulphide, potassium sulphide and the like. In this way it is possible in a very simple manner to obtain the whole of the silver in the form of silver sulphide whilst at the same time the solutions are regenerated and may be rendered fit for re-use by separation from the silver sulphide. For example the regenerated alkali cyanide solution or thiosulphate solution may be employed again for leaching out silver-containing waste material, or the thiosulphate solution may be employed for example as a fixing solution.

By addition of the theoretically necessary quantity of soluble sulphide for the precipitation of silver, regenerated solutions are obtained which may be re-employed forthwith after the silver sulphide has been precipitated. If, on the other hand, excess sulphide is added to the solution then it must be removed before employing the solution again, since otherwise, when employing the solution for leaching out further quantities of silver-containing photographic waste material, silver would be precipitated as silver sulphide and hence would not be susceptible to further leaching out. Moreover the precipitated silver sulphide would be precipitated on the paper which is present and would discolour the latter.

Preferably the soluble sulphide is only added in small excess to the solution to be desilvered and a sufficient quantity of a suitable metal salt is added to the solution, after it has been separated from the precipitated silver sulphide, for the formation of insoluble sulphide so that the whole of the sulphide present in the solution is precipitated. It is advantageous to employ a silver salt, for example silver nitrate, as the precipitating agent, since in this case no foreign substances are introduced into the solution and even if an excess of silver salt is used the silver thus introduced into the solution may always be recovered by employing the latter in a cyclic process.

The process for the recovery of silver from the solution by precipitation by means of soluble sulphides has the advantage that it is extraordinarily simple and cheap to carry out, that the solution remains effective for a long time and may always be re-employed for desilverisation of photographic waste material and the like.

It has already been proposed to subject silver-containing waste material, such as photographic and cinematographic films, to a pretreatment with a sodium sulphate solution, then to subject the silver or silver oxide present to a treatment with a solution of a copper salt containing hydrochloric acid, then to wash with water and finally to leach out with sodium cyanide solution or thiosulphate solution. This process is complicated and has the disadvantage that by-products, such for example as gelatine and paper, are insufficiently preserved. For example the gelatine or the photographic paper is rendered impure by treatment with the solution of a copper salt; moreover there is the danger that copper may be introduced into the silver and consequently the latter may require a special working up (separation).

It is possible, according to the present invention, by direct treatment of the waste material with a solution of alkali cyanide, to recover the whole of the silver present in the most simple manner and moreover to recover the remaining components of the waste material, such as paper, gelatine and the like, without deleterious effect to the latter. Likewise the present invention permits of the recovery of the total silver from waste material containing silver compounds by simple treatment with non-poisonous thiosulphate solutions. When working up waste material containing metallic silver in large quantities with thiosulphate solutions according to my present process, the pretreatment with sodium sulphate may be omitted and the conversion of the silver into soluble silver compounds may be effected by employing harmless agents such as hydrogen peroxide or chlorine in the presence of water.

In order that my invention may be well understood the following examples thereof are given by way of illustration only:

1. 25 gms. of silver-containing gelatine film residues which have been subjected to treatment with acetone are leached out with 1000 cc. of an alkaline 1% sodium cyanide solution with occasional shaking and aeration. The liquid is poured off after standing for 2 hours. The residual gelatine is washed out with water and dried. The gelatine is now completely free from silver.

2. 100 gms. of photographic paper is treated with 1000 cc. of an 0.1% sodium cyanide solution which has been adjusted with the aid of milk of lime to a pH value of 8 to 9. The mixture is allowed to stand for half an hour with stirring and good aeration of the solution. The liquid is then poured off, the paper remaining behind is rinsed with water and if desired dried.

What I claim is:

1. A process for the recovery of silver from waste photographic material containing a substance selected from the group consisting of silver and compounds of silver which comprises leaching out the waste material with a solution containing alkali cyanide and having a pH of more than 7, separating the silver-containing solution so formed from the residual material, and treating such silver-containing solutions for the recovery of silver therefrom.

2. A process for the recovery of silver from waste photographic material containing a substance selected from the group consisting of silver and compounds of silver which comprises leaching out the waste material with solutions containing alkali cyanide in an amount of 0.001% to 3%, and having a pH value of from 8 to 9, separating the silver-containing solutions so formed from the residual material, and treating such silver-containing solutions for the recovery of silver therefrom.

3. A process for the recovery of silver from gelatine containing silver, comprising converting the gelatine into a swollen condition, leaching out the swollen gelatine with a solution containing 0.1% to 3% alkali cyanide and having a pH value of 8 to 9, separating the silver-containing solution so formed from the residual material, and treating such silver-containing solution for the recovery of silver therefrom.

4. A process for the recovery of silver from waste photographic material containing silver and a compound of silver which comprises leaching out the waste material with solutions containing alkali cyanide in an amount of 0.001% to 3%, and having a pH value of from 8 to 9, separating the silver-containing solutions so formed from the residual material, and treating such silver-containing solutions for the recovery of silver therefrom.

AUGUST GOETTE.